Nov. 19, 1935.  S. STERLING  2,021,812
OPHTHALMIC LENS AND METHOD OF MAKING THE SAME
Filed July 26, 1935   2 Sheets-Sheet 1
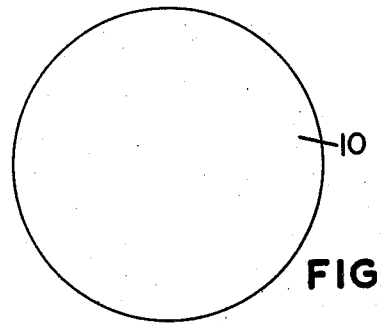
FIG.1
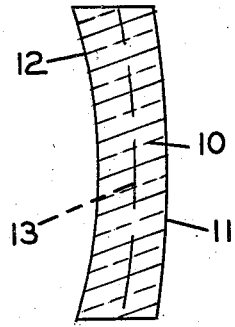
FIG.2
FIG.3
SCOTT STERLING
INVENTOR Nov. 19, 1935.   S. STERLING   2,021,812
OPHTHALMIC LENS AND METHOD OF MAKING THE SAME
Filed July 26, 1935   2 Sheets-Sheet 2

SCOTT STERLING
INVENTOR
BY
ATTORNEYS

Patented Nov. 19, 1935

2,021,812

UNITED STATES PATENT OFFICE 2,021,812

OPHTHALMIC LENS AND METHOD OF MAKING THE SAME

Scott Sterling, Brighton, N. Y., assignor to Bausch & Lomb Optical Company, Rochester, N. Y., a corporation of New York Application July 26, 1935, Serial No. 33,249

8 Claims. (Cl. 88—54)

The present invention relates to ophthalmic lenses and more particularly to a series of corrected ophthalmic lenses having balanced curvatures.

At the present time corrected ophthalmic lenses are made on the multibase principle, that is, the semi-finished lenses or lens blanks are furnished to opticians in series ground to different base curves. Each of these base curves applies to a limited range of powers and in filling a prescription it is only necessary to grind one surface of these lenses to the curve set forth in the finishing chart.

Heretofore, these corrected series of lenses have been subject to one serious objection. Under such prior art practice it often happens that a pair of spectacles will include two lenses of different dioptric powers and even though the difference in power may be only a quarter or half a diopter, still the finished lenses appear to be unmatched so that the pair of spectacles is undesirable from a cosmetic standpoint. Such difference in appearance of the two lenses is due to the fact that one lens may fall within one group employing one base curve while the other lens, even though not differing greatly in dioptric power, may fall within another group using a different base curve. For this reason, some people were prejudiced against the use of corrected lenses and refused to wear them.

One of the objects of the present invention is to produce a multibase series of corrected ophthalmic lenses having balanced curvatures. Another object is to produce a multibase series of lenses in which each lens in the series appears to be matched with every other lens in the series. A further object is to provide a multibase series of lenses in which the difference in power between the base curves in proximate groups and the coflexure or means curvature of the lens are kept within narrow limits. A still further object is to provide a method of making ophthalmic lenses of substantially uniform appearance. These and other objects and advantages reside in certain novel features of construction and combination as will hereinafter be more fully set forth and pointed out in the appended claims.

Referring to the drawings:

Fig. 1 is a plan view of a lens embodying this invention.

Fig. 2 is a vertical section thereof.

Fig. 3 is a portion of a lay-out chart showing one grouping of lenses embodying this invention.

Figure 4:
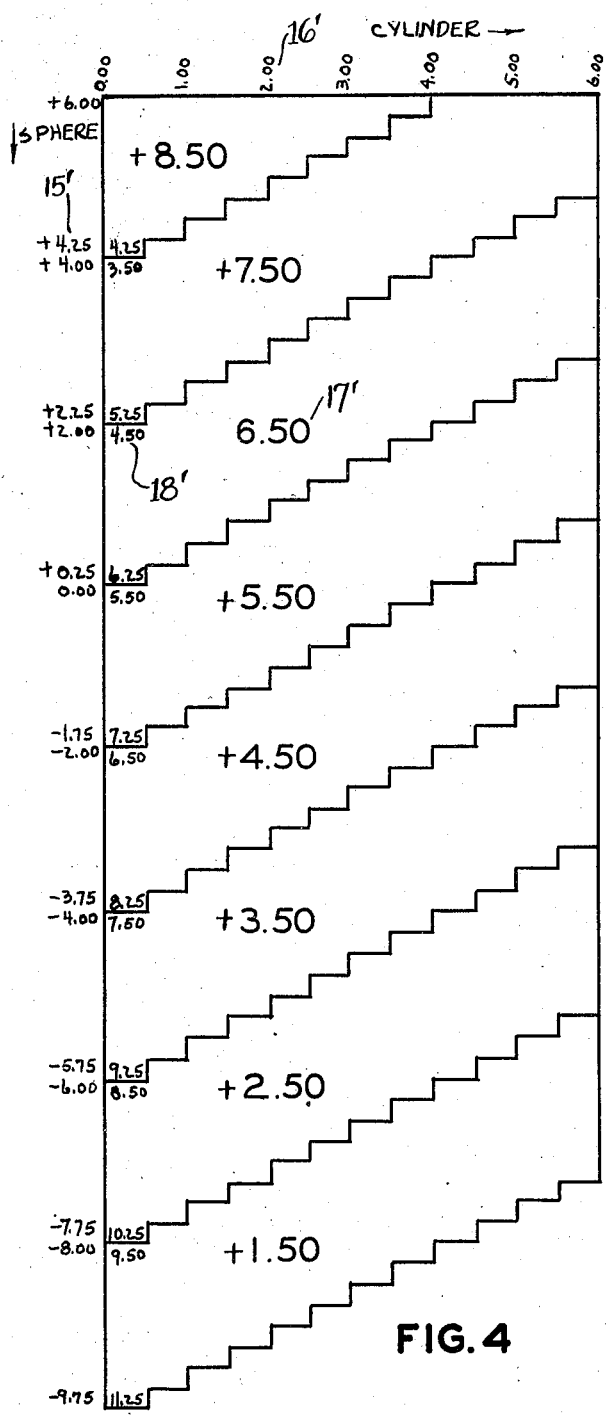
Fig. 4 is a portion of a lay-out chart showing another grouping of lenses embodying this invention.

In order that two lenses of different power may have similar appearance, it is not sufficient that one surface of each lens have the same curvature as the corresponding surface of the other, but the average curvature, or mean bending, of the lenses should be similar. This average curvature, or mean bending, is the curvature through the middle of the lens, midway between the front and rear surfaces, and is designated by the term coflexure. The meaning of the term coflexure, as applied to a lens, is illustrated in Figs. 1 and 2 wherein 10 indicates a lens having a front surface 11 and a rear surface 12. The curve indicated by the dotted line 13 lies midway between the surfaces 11 and 12 and therefore represents the coflexure or mean bending of the lens 10.

Expressed mathematically, the coflexure is one half of the algebraic difference in power between the two surfaces of the lens. Thus, if the lens 10 is spherical and has a power of $-2.25$ diopters, the lens can be made by grinding a spherical curve of $+5.00$ diopters on the surface 11 and a spherical curve of $-7.25$ diopters on the surface 12. The curvature of the line 13, or the coflexure of the lens, will then be $$\frac{+5.00D-(-7.25D)}{2}$$

or 6.00 diopters.

Toric lenses have one surface on which the curvature in one meridian differs from the curvature in the other meridian. In determining the coflexure of such a lens, the curvature of the toric surface is regarded as the mean between the curvature in the two meridians. A toric lens having a spherical power of $-0.50$ diopters and an added cylindrical power of $+1.00$ diopters could be made by grinding on the convex surface a curvature of $+5.75$ diopters in one meridian and a curvature of $+6.75$ diopters in the other meridian and by grinding a curvature of $-6.25$ diopters on the concave surface. The mean curvature of the toric surface will thus be $$\frac{+5.75D+6.75D}{2}$$

and the coflexure of this toric lens will be ½

$$\left(\frac{+5.75D+6.75D}{2}-[-6.25D]\right)$$

or 6.25 D. Thus if a patient required a spherical correction of $-2.25$ diopters in one eye and a correction of —0.50 diopters of spherical power plus +1.00 diopters of cylindrical power in the other eye, the two lenses described above would make suitable eyeglasses and would appear to be matched since their coflexures differ by only 0.25 diopters.

Fig. 3 is a surfacing chart for a series of lenses in which the coflexures are maintained within narrow predetermined limits. In this chart, the different spherical powers for the lenses in the series are indicated by the small numbers, indicated at 15, arranged vertically to the left of the chart, while the different cylindrical powers are indicated by the small numbers, shown at 16, arranged horizontally above the chart. Each block, such as 14, represents a group of semi-finished lens blanks in the series having the same base or rotation curve designated by the large numeral, shown at 17, within each block 14. This rotation curve is the curve formed in one meridian of the convex surface and gives the surface the spherical power to which any cylindrical power is added. The small numerals, indicated at 18, within each block, denote the concave curves to be formed on the unfinished surface of the lens blank, in order to complete lenses of the desired power. Only the limits of the spherical and cylindrical powers of the semi-finished blanks are shown in the drawings. Thus, the reference characters 15 and 16 indicate, respectively, only the limits of the spherical and cylindrical powers which can be obtained with semi-finished blanks in a particular group. Likewise the numerals indicated at 17, represent the limits of the concave curve to be ground on the unfinished surface of the lens blank. It is to be understood, however, that in a complete layout chart, all of the values intermediate these limits would be included, but, for the purposes of illustration, only the limiting values are necessary.

The block 14 on the chart in Fig. 3, indicates the group of semi-finished lens blanks having spherical powers ranging from —0.50 diopters to +0.75 diopters, combined with cylindrical powers ranging from zero to +1.00 diopters. All of the blanks in this group have a base or rotation curve of +5.75 diopters on the convex, finished surface. In order to make a spherical lens of +0.75 diopters, the optician need only grind a curve of —5.00 diopters on the unfinished concave surface of the blank, as indicated by the chart. A toric surface has a cylindrical component added to the base or rotation curve in one meridian and the curvature in this meridian is known as the cross curve, as distinguished from the rotation curve in the other meridian. The convex toric surface is always formed by the manufacturer so that the unfinished concave surface of the blank can always be ground with a spherical curvature. The power of the concave surface will, of course, be the same for all lenses of the same spherical power within a group, regardless of the cylindrical power.

The chart in Fig. 4 is laid out in the same manner as the chart in Fig. 3 and the numerals indicated at 15', 16', 17' and 18' have the same significance as the numerals 15, 16, 17 and 18 respectively. The chart in Fig. 4, however, represents a grouping of lenses different from that indicated in Fig. 3, but embodying the same principle of maintaining the coflexures within predetermined limits. These surfacing or layout charts are well known to those skilled in the art.

For readily and exactly determining mathematically the coflexure of the lenses indicated on the charts shown in Figs. 3 and 4, let
M = coflexure in diopters
S = sphere power of the lens
C = cylinder power of the lens
$D_1$ = power of the spherical front surface
$D_2$ = power of the spherical rear surface The mean curvature of a toric rear surface is $$\frac{D_2+D_2+C}{2}$$

The mean curvature of a toric front surface is $$\frac{D_1+D_1+C}{2}$$

Then, using the ordinary sign convention of plus for convex curves and minus for concave curves, for spherical lenses $$M=\frac{D_1-D_2}{2}$$

for lenses having a toric rear surface $$M=\frac{D_1-\frac{D_2+D_2+C}{2}}{2}=\frac{D_1-D_2}{2}-\frac{C}{4}$$

$$D_1-D_2=2D_1-D_1-D_2=2D_1-(D_1+D_2)$$

$$M=\frac{2D_1-(D_1+D_2)}{2}-\frac{C}{4}=D_1-\frac{D_1+D_2}{2}-\frac{C}{4}$$

Substituting S for $D_1+D_2$ $$M=D_1-\frac{S}{2}-\frac{C}{4}$$

for lenses having a toric front surface $$M=\frac{\frac{D_1+D_1+C}{2}-D_2}{2}=\frac{D_1-D_2}{2}+\frac{C}{4}$$

$$D_1-D_2=D_1+D_2-2D_2$$

$$M=\frac{D_1+D_2-2D_2}{2}+\frac{C}{4}=\frac{D_1+D_2}{2}+\frac{C}{4}-D_2$$

Substituting S for $D_1+D_2$ $$M=\frac{S}{2}+\frac{C}{4}-D_2$$

Referring to the chart in Fig. 3, a spherical lens having a power of —2.50 diopters would have a convex surface of +4.00 diopters and a concave surface of —6.50 diopters. The coflexure of this lens would then be $$\frac{(+4.00)-(-6.50)}{2}=5.25 \text{ diopters.}$$

In the same series a lens having a spherical power of +3.00 diopters and a cylindrical power of +1.25 diopters would have a base or rotation curve of +6.50 diopters and a cross curve of +7.75 diopters. The concave surface of such a lens would have a spherical curvature of —3.50 diopters. The coflexure of the second lens would then be $$\left(\frac{3}{2}+\frac{1.25}{4}\right)-(-3.50)=5.31 \text{ diopters.}$$

The coflexures of the two lenses thus differ by only 0.06 diopters and the lenses would appear matched even though they differ in power by more than 5.50 diopters.

In the grouping represented by chart shown in Fig. 4, a lens having a spherical power of +2.00 diopters would have a convex front surface of +6.50 diopters and a concave rear surface of —4.50 diopters. Its coflexure would then be $$\frac{+6.50-(-4.50)}{2}=5.50 \text{ diopters.}$$

A second lens having a spherical power of —4.00 diopters would have a convex surface of +3.50 diopters and a concave surface of —7.50 diopters. The coflexure of this second lens would be $$\frac{+3.50-(-7.50)}{2}=5.50 \text{ diopters.}$$

Here, although the two lenses differ in power by 6.00 diopters, they appear matched as their coflexures are equal.

In the chart shown in Fig. 3, the difference in power between proximate base curves increases from the zero power lenses to the high power lenses both plus and minus, while in the chart shown in Fig. 4, the difference in power between proximate base curves is equal throughout the series. Each of these systems has its own advantages and employs the same number of base curves. In the series indicated in Fig. 3 the difference in coflexure between the lenses within the so-called popular powers, that is, between + 4.00 D. and — 4.00 D. is kept to a small limit while in the series indicated in Fig. 4, the lenses have a larger variation of coflexure within the popular powers but the limit of variation in the coflexure for the entire series is lower.

From the foregoing it will be apparent that I am able to obtain the objects of my invention and provide a series of semi-finished ophthalmic lenses or lens blanks, and provide a method of making ophthalmic lenses in which each lens of the series substantially matches every other lens in appearance. Throughout the series of powers, the coflexures or mean bending of the lenses are kept substantially constant within predetermined limits. Various modifications can, of course, be made without departing from the spirit of my invention or the scope of the appended claims.

I claim:

1. A method of making ophthalmic lenses which comprises providing a series of groups of semi-finished blanks each having a surface curve which is common to all blanks of a single group but which is different for each group, and forming another surface on each of said blanks to provide finished lenses of the desired dioptric powers while maintaining the coflexures of all of the finished lenses within such limits that each finished lens will appear to be matched with every other lens in the series.

2. A method of making opthalmic lenses which comprises providing a series of groups of semi-finished blanks each having a surface curve which is common to all blanks of a single group but which is different for each group, and forming another surface on each of said blanks to provide finished lenses of the desired dioptric powers while maintaining the difference of coflexure of any two finished lenses at a value between zero and a value equal to the difference between the surface curves of any two proximate groups.

3. A series of ophthmalic lenses comprising a plurality of groups of lenses, each lens within a given group having a curve which is characteristic of all lenses in that group, each group of lenses having a different characteristic curve, the difference in diopters between the coflexures of any two lenses in the series ranging between zero and a value no greater than the difference in diopters between the characteristic curves for any two proximate groups of the series.

4. A series of ophthalmic lens blanks comprising a plurality of groups of blanks, each blank within a given group having a characteristic curve which is common to all blanks within that group, each group of blanks having a different characteristic curve, the coflexures of lenses finished from any two blanks of the series differing by an amount, in diopters, which lies between zero and a value equal to the difference, in diopters, between the characteristic curves of any two proximate groups.

5. A multibase series of lenses in which the difference in coflexure between any two lenses in the series is an amount between zero and a value equal to the difference in power between two proximate base curves whereby each finished lens appears to be matched with every other lens in the series.

6. A multibase ophthalmic lens series of different powers in which the spherical power of successive base curves differ by an amount not more than one diopter and in which the coflexure is kept at a substantially constant value whereby the appearance of the lenses does not vary substantially beyond the limits of noticeable difference.

7. A multibase series of toric lenses in which the spherical component of the base curve is decreased as the cylindrical component is increased, and in which the coflexure is maintained within such limits that each finished lens will appear to be matched with every other lens in the series.

8. A multibase series of ophthalmic lens blanks in which the proximate base curves differ by a fixed equal amount not less than one half of one diopter nor more than two diopters and in which the coflexures of any two lenses in the series do not vary by an amount more than said fixed amount whereby the appearance of the lenses does not vary substantially beyond the limits of noticeable difference.

SCOTT STERLING.